(12) United States Patent
Clapper

(10) Patent No.: US 6,200,139 B1
(45) Date of Patent: Mar. 13, 2001

(54) OPERATOR TRAINING SYSTEM

(75) Inventor: Edward O. Clapper, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/258,848

(22) Filed: Feb. 26, 1999

(51) Int. Cl.[7] .................................................. G09B 9/04
(52) U.S. Cl. .......................................... 434/62; 600/587
(58) Field of Search .............................. 396/18, 50, 51; 434/62; 600/587, 595; 364/516.44

(56) References Cited

U.S. PATENT DOCUMENTS

| | | | |
|---|---|---|---|
| 5,138,555 | 8/1992 | Albrecht | 364/424.06 |
| 5,373,857 | * 12/1994 | Travers et al. | 600/587 |
| 5,471,542 | 11/1995 | Ragland | 382/128 |
| 5,583,795 | * 12/1996 | Smyth | 364/516.444 |
| 5,764,291 | * 6/1998 | Fullam | 396/50 X |
| 5,839,000 | * 11/1998 | Davis, Jr. et al. | 396/51 |

FOREIGN PATENT DOCUMENTS

| | | |
|---|---|---|
| 0 596 868 A2 | 5/1994 | (EP) . |
| 0 660 291 A1 | 6/1995 | (EP) . |
| 0 990 416 A1 | 4/2000 | (EP) . |

OTHER PUBLICATIONS

Eye Gaze Tracking for Visually Controlled Interactive Stereoscopic Displays by Talmi et al., published Nov. 28, 1998.*
Determination of the Point of Fixation in a Head Fixed Coordinate System, by Liu, prototype released 1997 and published Nov. 28, 1998.*

* cited by examiner

*Primary Examiner*—Sam Rimell
(74) *Attorney, Agent, or Firm*—Trop, Pruner & Hu, P.C.

(57) ABSTRACT

A system for operator training and evaluation may detect and record information about various actions taken by an operator. For example, the system may record what the operator looks at in the course of operating the vehicle to determine whether the operator is looking at the things which the operator should appropriately be checking. In addition the system may provide other information about other aspects of the operator's performance including speed and use of controls and indicators. This information may be correlated and provided in the form of an evaluation. Alternatively, the operator may be prompted in the course of operating the vehicle to correct the operator's performance to improve the operator's skill.

25 Claims, 5 Drawing Sheets

OPERATOR TRAINING SYSTEM

BACKGROUND

This invention related generally to systems for training and evaluating operators of vehicles such as automobiles, trucks, airplanes, trains, boats and the like.

Currently, vehicle operators may be trained using simulators. For example, aircraft training simulators are known which expose the operator to a variety of different conditions and evaluate the operator's response to those conditions. In addition, in automated driver testing, the driver may be asked a series of questions and his or her answers are then checked against the correct answers in a computer database. All of these approaches respond to the need to obtain better and lower cost evaluation and training of vehicle operators. This hopefully improves the performance of those operators and reduces their training cost.

Some characteristics of a good operator may be difficult to assess. A trainer may watch the operator for certain characteristics such as checking rear view mirrors, and checking gauges and the like. However, an objective evaluation of whether the person has mastered the skills necessary to operate the vehicle correctly may be difficult to obtain. For example, it may be difficult to compare the abilities of one driver quantitatively to those of other drivers.

Thus, there is a continuing need for better techniques for training and evaluating vehicle operators.

SUMMARY

In accordance with one embodiment, a vehicle operator training system may include a sensor adapted to sense what an operator looks at. A controller is adapted to record information about what the operator looked at.

DETAILED DESCRIPTION

Figure 1:
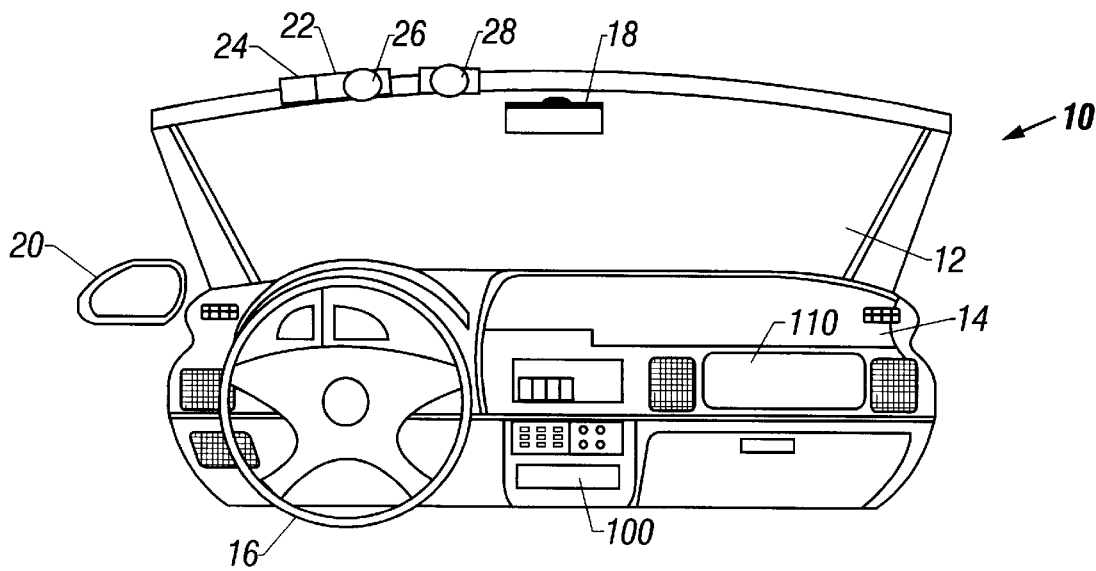
FIG. 1 is a front elevational view of the front cockpit area of a vehicle as seen by the operator.

Referring to FIG. 1, a vehicle operator may sit in a cockpit 10 which may be a simulator or an actual vehicle such as an automobile, truck, airplane, train or boat, as examples. The cockpit 10 may include a windshield 12, a dashboard 14, a steering wheel 16, a rear view mirror 18, and a side view mirror 20. It may also include a gaze camera 26 and an eye camera 28.

The gaze camera 26 may be coupled by a pan/tilt unit 22 to infrared light emitting diodes (LEDs) 24. The cameras 26 and 28 provide the input information to determine what the operator looks at in the course of operating the vehicle. This can be used to evaluate whether the operator is appropriately using sources of information to effectively operate the vehicle.

For example, in an automobile application, the system may determine whether the operator looks out the front windshield 12, whether the operator scans around the front windshield, whether the operator checks the side view mirror 20 and the rear view mirror 18 and whether the operator checks the various gauges provided on the dashboard 14.

The eye camera 28 may have a short focal distance and may be used to measure the three dimensional eye position. The gaze camera 26 may be used to determine a gaze function. It may have a long focal distance and may be panned and tilted to follow the eye when the head moves. The infrared LED array 24 may be mounted a short distance from the optical axis of gaze camera to illuminate the eye and to cause a reflection on the eye that may be useful in tracking the movement of the eye.

A system is described herein for determining what the user is looking at, using eye and gaze tracking, principle component analysis and an infrared LED array. However, the invention is in no way limited to this technology. Instead, this technology is merely described to illustrate one technique for determining what the operator is looking at while operating the vehicle. Other known techniques for determining what a person looks at include using head mounted cameras. For example, a grid of LEDs may be pulsed in sequence. The camera image may be processed to detect flashes. Another system uses a number of video cameras to capture simultaneous images that are coordinated to track an object.

The illustrated system is further explained in "Determination of the Point of Fixation in a Head-fixed Coordinate System," by Jin Liu presented at the $14^{th}$ International Conference in Pattern Recognition (ICPR'98) held at Brisbane, Australia Aug. 17–20, 1998. Additional information about the system may also be found in an article by Kay Talmi and Jin Liu, titled "Eye and Gaze Tracking for Visually Controlled Interactive Stereoscopic Displays" which may currently be found on the Internet at http://www.hhi.de/~blick/papers/eyegaze 97/eye-gaze.html.

Figure 2:
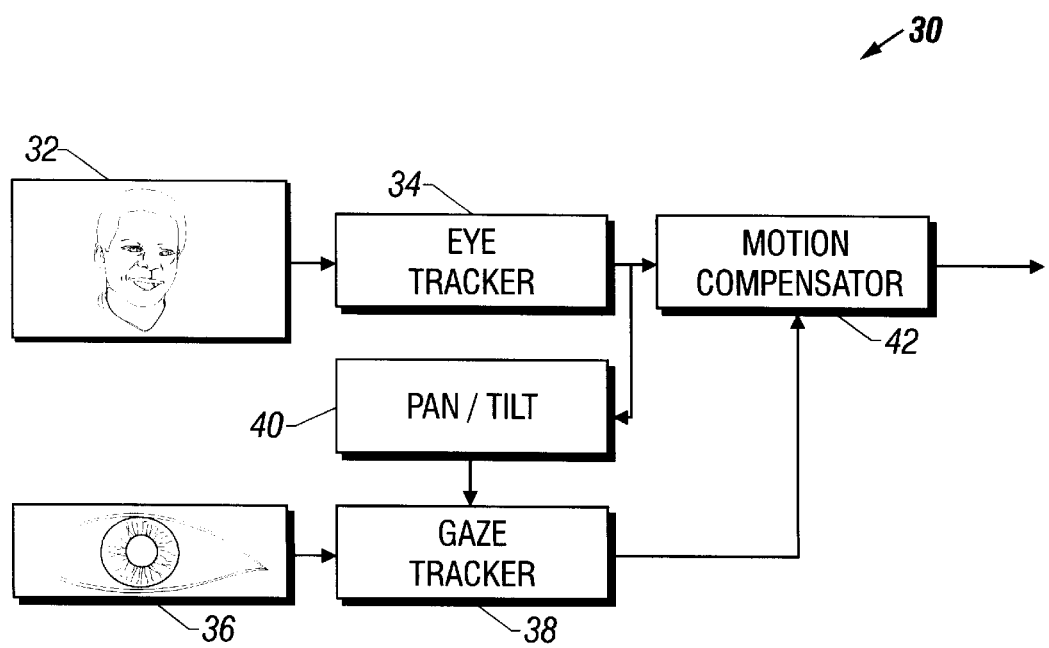
FIG. 2 is a block diagram of an apparatus for detecting what an operator looks at in the course of operating a vehicle.

Referring to FIG. 2, the eye tracker 34 and gaze tracker 38 receive inputs from the cameras 26 and 28. Namely, as illustrated by the image 32, the eye tracker receives a digital image from the camera 26 which corresponds to a face shot of the operator. At the same time, the gaze tracker 38 receives an image of one or both of the operator's eyes. The eye tracker analyzes the video image of the eye camera 28 and detects and tracks three dimensional eye position. In addition, either or both pupils may be detected and tracked to allow calculation of the three dimensional The eye tracker 34 may cause the eye camera 28 to be panned and tilted, using the pan/tilt unit 40, to follow the position of the eye as the operator's head moves. Motion compensation may be provided as indicated at block 42 to compensate for operator head movement.

Initially a still head camera image may be received for analysis. Dark regions called valleys may be identified and eliminated to expedite the ensuing analysis.

Principal component analysis (PCA) may be used to locate the operator's eyes. In a training phase, characteristics of human eyes may be recorded to locate eye position using PCA. These characteristics may be stored as reference eye patterns called eigenfaces. The camera 26 image may then be analyzed and compared with the stored eye patterns to locate the eyes. In one embodiment, these determined eye locations may be searched in another stereoscopic camera image (if an additional camera is used). By stereo matching, the three dimensional positions of both eyes can be determined. This information may then be used to control the pan and tilt unit 22 of the eye camera 26.

A cornea-reflex method may be used to determine the gaze direction. Low power infrared LEDs 24 may be mounted on the pan tilt unit 22 at one side of the camera 26 with the normal of the array surface parallel to the optical axis of the camera 26. The LEDs 24 may illuminate the eye and generate a highlight on the cornea. A cornea reflex algorithm may identify the center of one or both of the pupils and the center of the cornea surface reflection. The distance between the two centers and their orientation may be used to determine gaze direction. The change in gaze direction due to head movement may be compensated using information regarding the three dimensional head position.

PCA represents the general characteristics of human eyes using relatively few dimensions. PCA transforms a luminance description of the eyes into a different coordinate system. This coordinate system is such that the mean square error arising from truncating basic vectors of the coordinate system is reduced.

Figure 3:
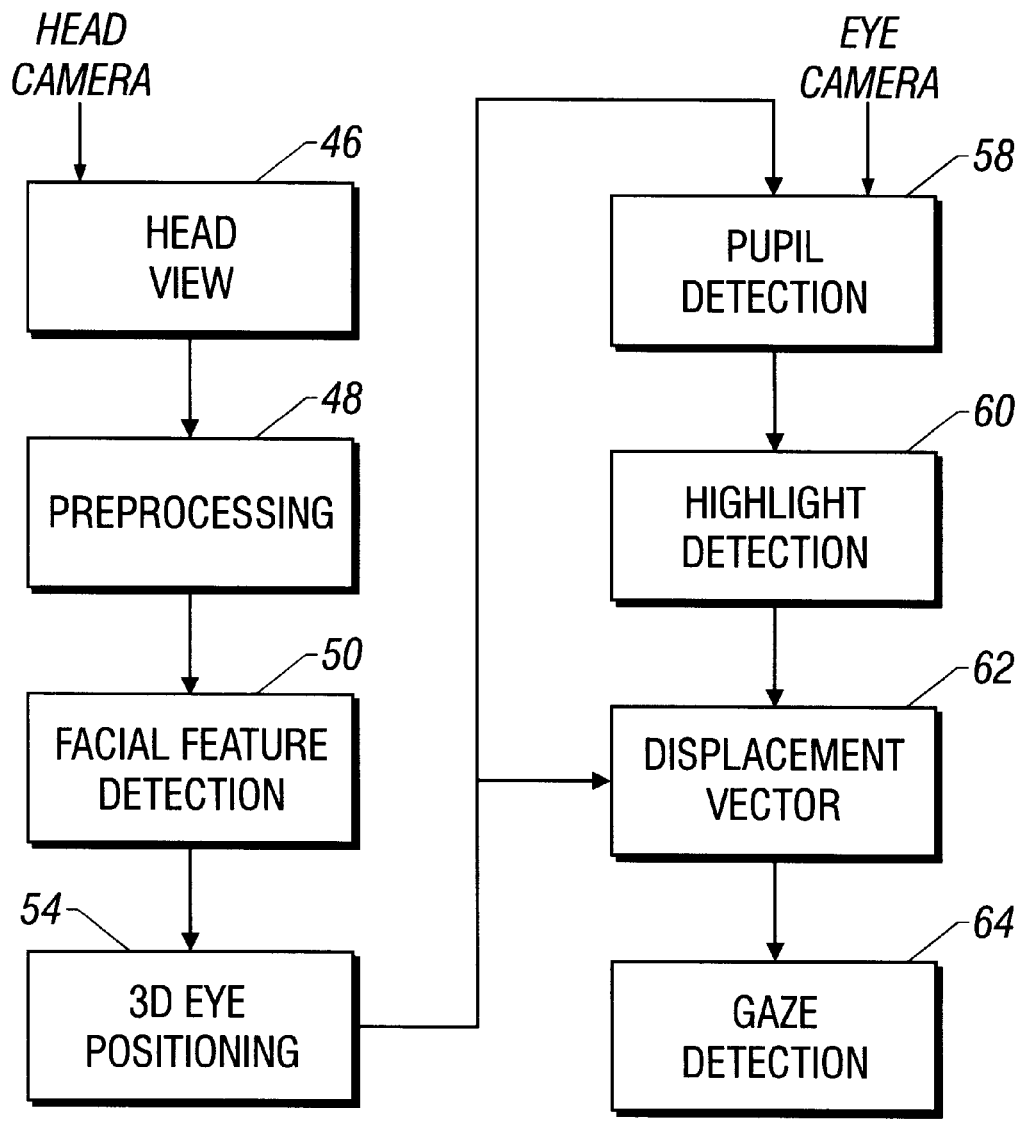
FIG. 3 is a flow chart for determining what the operator is looking at while operating a vehicle.

Referring now to FIG. 3, the input from the camera 28 may be used to develop the head view shown at 32 in FIG. 2 and as indicated at block 46 and FIG. 3. During preprocessing, indicated in block 48, the system may deduce some initial characteristics of facial features. For example, dark areas may be eliminated since they may not be as useful in locating facial features that indicate eye location. At block 50, facial feature detection may be implemented using PCA. At block 54, the three dimensional eye position may be determined using either a single camera or a pair of stereoscopic cameras. The location of the pupil may then be detected using pattern recognition and/or cornea reflection analysis as indicated in block 58 using the input from camera 26 as indicated at 36 in FIG. 2.

The highlight caused by the LED reflection on the cornea may be detected as indicated in block 60 and a displacement factor determined as indicated in block 62. The displacement factor corrects for movement of the head, using information from the other camera 28. Finally the PCA analysis is utilized to determine the gaze direction (block 64), as indicated at block 66.

In one embodiment of the invention, a plurality of cameras may be distributed around the cockpit to facilitate face location when the user turns around. For example, when the operator turns to look behind the vehicle, the cameras 26, 28 may "lose" the operator's face. The cameras distributed about the cockpit can be used to detect the position of the operator's face. This information may be analyzed to determine whether the operator's actions were appropriate.

Figure 4:
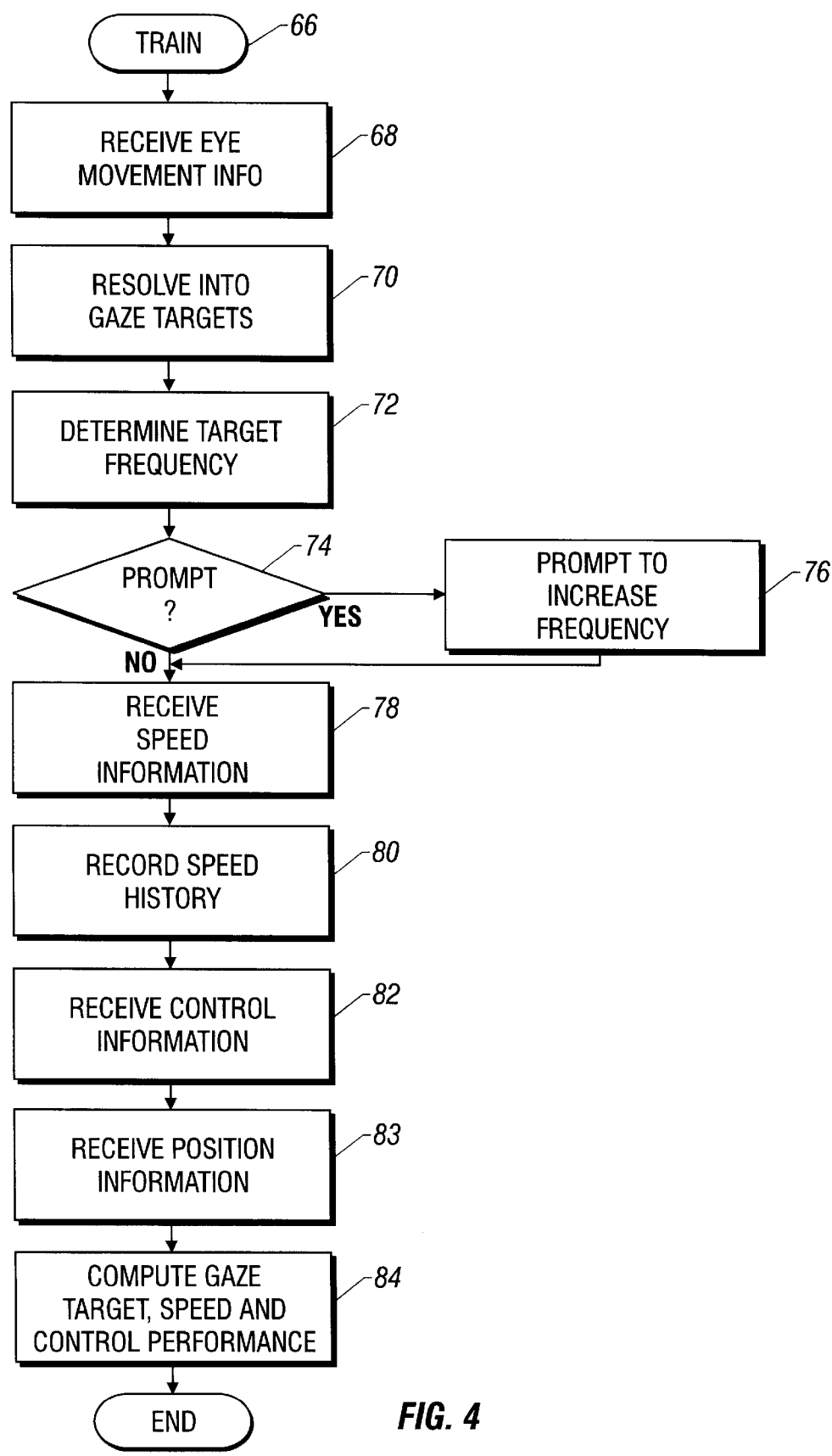
FIG. 4 shows a flow chart for evaluating an operator in accordance with one embodiment of the present invention.

The gaze direction may be used to evaluate or train the operator. Referring to FIG. 4, software 66 may begin by receiving eye movement information as indicated in block 68. In one embodiment, this may be information about what the eye is actually looking at, at any instance in time. This information may then be resolved into gaze coordinates as indicated in block 70.

The gaze coordinates may correspond to targets such as the side view or rear view mirrors. In one embodiment, the gaze coordinates may include information about what the eye is actually looking at any instance in time. For example, the gaze coordinates information may be resolved into gazed upon targets as indicated in block 70. Knowing the gaze coordinates of the operator and coordinates of gaze targets, the particular object being viewed can be determined. The gazed upon targets correspond to targets such as the side view or rear view mirrors, the instrument panel and the front windshield in an automobile. The coordinates of each of these objects may be compared to a given gaze direction and when the gaze direction detected by the system 30 correlates generally to a given target's coordinates, that gaze information can be resolved to determine that the operator's gaze is directed to one of the known gaze targets.

Next, the target gaze frequency may be determined by determining how many times the operator looked at a given gaze target or object, as indicated in block 72. In this way, the system can determine in a given predefined course of travel how many times the operator looked at given objects.

Thus, in one example, the operator may operate the vehicle, travelling a simulated course in which the number of times which the operator should check each target may be known. Alternatively, the operator may operate the vehicle over a known course wherein it is known how many times the operator should reasonably be expected to check the various gaze targets. Alternatively, the target gaze frequency information may be correlated and compared to standard ranges of gaze frequencies. For example, it may be determined that on average the operator should check the rear view mirror X number of times per hour. Knowing the predetermined frequency, an analysis may be undertaken to determine if the operator's performance falls within established norms.

At diamond 74, a check determines whether the operator should be prompted to change his or her gaze frequency. Rather then simply evaluating the user, the system may train the operator to increase his or her frequency of checking particular sources of information. For example, if it is determined that the operator is not checking the rear view mirror frequently enough, the operator could be prompted as indicated in block 76 to check the rear view mirror more often.

The system may also receive other information including the vehicle's speed as indicated in block 78. The speed history may be recorded and may be compared to known speed limits or known speed recommendations for a given course. Next, the system may receive control information as indicated in block 82. The system may record when and how often the operator applies the brakes or other controls and how often the operator uses the turn indicator or other indications. As before, this information may be compared to what is expected over a predefined course or to norms in other cases.

The system may also receive vehicle position information, as indicated by block 83. Vehicle locating apparatus, such as a global positioning system (GPS) receiver may be used to determine the vehicle's position and that information may be correlated with gaze target information. The system can then evaluate whether the operator was looking at what the operator should have been looking at, at a given position, for example, in a predefined training or evaluation course.

Referring to block 84, the operator's gaze target frequency, speed and control/indicator performance may be evaluated. This may be done by comparing the operator's performance to a database of normal values over a wide range of different operators over different courses and conditions. Alternatively, it may be developed by comparing the operator's performance over a known course to expected performance. The operator may then be provided information about how his or her operating skills compare to what is expected. This may be used to evaluate the operator in the case of operator testing or to provide feedback to the operator about how to improve his or her performance.

Figure 5:
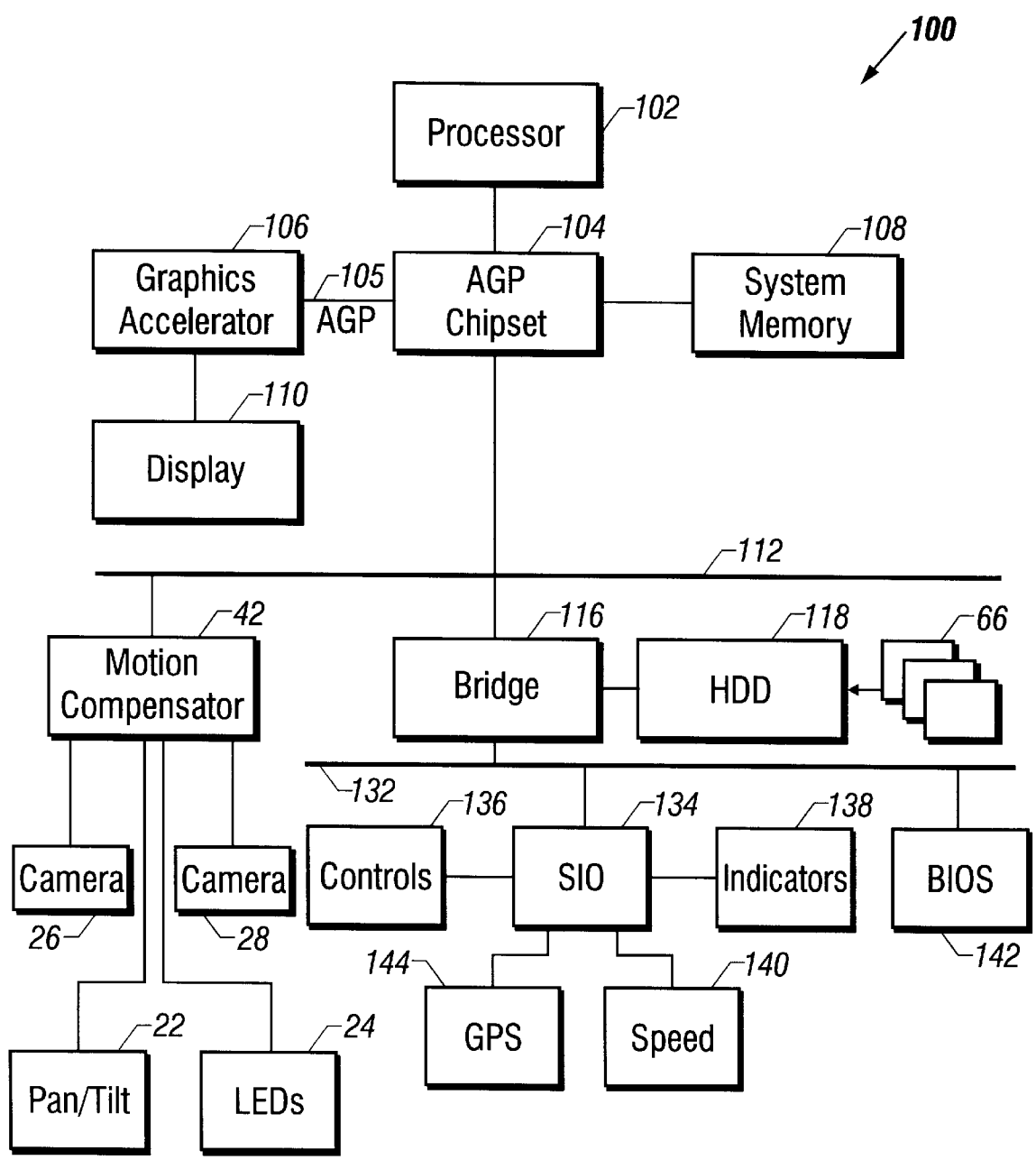
FIG. 5 is a diagram showing one embodiment of a processor based system for implementing the system shown in the preceding figures.

A processor based system 100 for implementing one embodiment of the invention, shown in FIG. 5, includes a processor 102. In one embodiment, the processor may be coupled to an accelerated graphics port (AGP) (see Accelerated Graphics Port Interface Specification, version 1.0, published on Jul. 31, 1996, by Intel Corporation, Santa Clara, Calif.) chipset 104 for implementing an accelerated graphics port embodiment. Chipset 104 may communicate with the AGP port 105 and the graphics accelerator 106. A display 110 may be coupled to the video output of the graphics accelerator 106. Then chipset 104 may also be coupled to the system memory 108 and to a bus 112.

The bus 112 is also coupled to the motion compensator 42. It may receive input signals from the cameras 26 and 28 and provide output signals to the pan/tilt unit 22 and the array 24. The bus 112 may also be coupled to a bridge 116 which couples a hard disk drive 118. The software 66 may be stored on the hard disk drive 118 together with eigenface information 116 and the calibration database 114. The bridge 116 may also coupled to another bus 132. The bus 132 may be coupled to a serial input/output (SIO) device 134. The device 134 may receive serial inputs from a control interface 136, an indicator interface 138 and a speed interface 140, each coupled to receive information from the vehicle and a position location system 144. Also coupled to the bus 132 is a basic input/output system (BIOS) 142.

Figure 6:
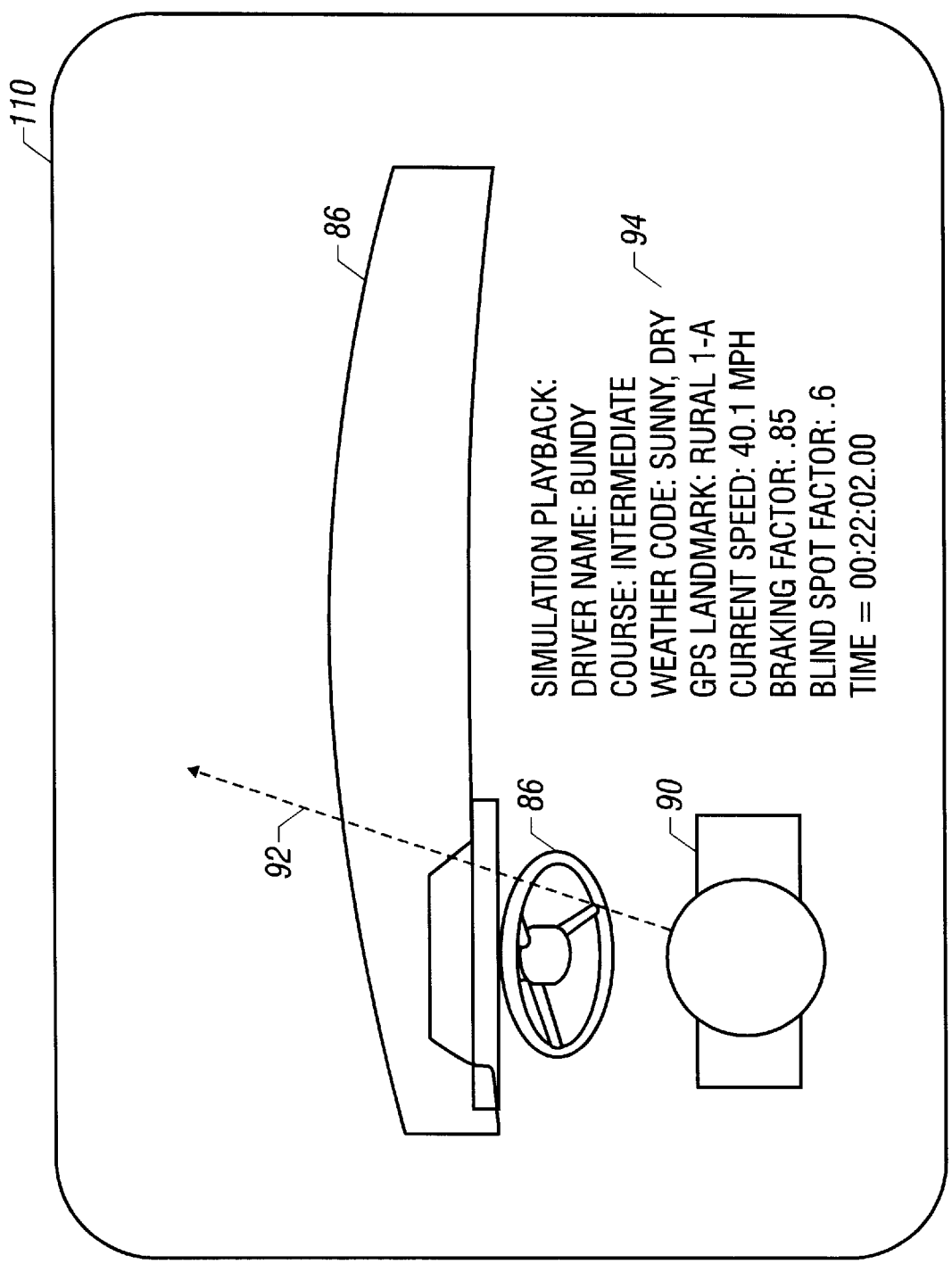
FIG. 6 is a screen display showing a simulated playback display of a driver's performance in accordance with one embodiment of the invention.

In accordance with one embodiment of the present invention, a processor based playback of a vehicle operating session may be undertaken to provide either performance evaluation or feedback to a given operator. Referring to FIG. 6, the display screen 110 may include a display which includes a dashboard 86, steering column 88 and driver 90 in a simulated format. The driver's line of sight is indicated by dashed line 92.

Based on the information received from the motion compensator 42, the driver's line of sight over time and at particular locations can be recreated as a graphical user interface such as the dashed line 92 shown in FIG. 6. Thus, the trainee and the trainer can view what the operator was looking at, at given instances of time and in given situations. For example, the display portion 94 may provide information about the circumstances at each instance of time. A global positioning system landmark may be indicated on the display, in one embodiment, to provide information about where the vehicle was when the operator was looking in a given gaze direction.

The information displayed on the screen, as indicated in 94, may include, for each instance of time, course conditions, weather indications, speed indications, a braking factor indicating the use of the brakes and a blind spot factor indicating how effective the driver was in monitoring blind spots. In this way, the trainee may view his or her performance replayed at regular time intervals or continuously along a given course. The replay may also indicate where the vehicle was when the operator reacted in a given fashion.

The system 30 may also provide exterior events which may be triggered by the system to either evaluate the operator's performance or to provide a training exercise. Exterior event generation may be synchronized with the vehicle's position as provided by a global positioning system receiver. For example, another vehicle may be caused to move into the vehicle's line of travel when the vehicle approaches a given position. The operator's response to the event, including how the operator's line of sight detects the event and how the operator responds, may be evaluated by the processor based system.

The exterior events may be based on set scripts triggered by global positioning coordinates of the vehicle to test the operator's performance under given conditions. The operator's response time to a given event may also be determined and recorded.

For example, if the operator continually avoids looking in a given direction or at a given item, the system may adaptively generate events which require viewing in that region. In this way, the operator can be conditioned to overcome bad habits, having seen the consequences of failing to maintain a wide range of view.

By determining global positioning coordinates for the vehicle, the operator's response to conditions keyed to land markers may be judged. For example, if GPS coordinates are known for the lane stripes, one can determine, based on global positioning system coordinates, whether the operator maintained a central position within his or her lane or wandered to the left or the right.

The system may also receive weather and time of day inputs which may be taken into account in evaluating the operator's performance. Weather, traffic conditions and other information may be retrieved from the Internet or by sensors along the way. This information may be used to evaluate the operator's performance under the existing conditions.

In some embodiments it may be desirable to provide a camera to record the view out the windshield. Then in a playback mode, the actual recorded view out the vehicle windshield may be played back to make the playback more realistic. The line of sight indicator may be overlaid onto the recorded image. In addition, video playback can provide more detailed feedback about what was occurring relative to the operator's line of sight and other operator reactions.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A vehicle operator training system comprising:
   a sensor to sense what an operator looks at;
   a storage storing information about a plurality of gaze targets; and
   a controller to develop a record of what the operator looked at in the course of an operator training session and to compare the record to said information about a plurality of gaze targets to determine whether the operator looked at said gaze targets in the course of an operator training session.

2. The system of claim 1 wherein said sensor includes a camera.

3. The system of claim 2 wherein said camera is a digital camera.

4. The system of claim 3 including a first camera to locate head position and a second camera to locate eye position.

5. The system of claim 1 including a position location device.

6. The system of claim 5 wherein said position location device is a global positioning system receiver.

7. The system of claim 1 including an interface adapted to receive information from vehicle controls.

8. The system of claim 1 including an interface adapted to receive vehicle speed information.

9. The system of claim 1 including an interface adapted to receive information about the use of vehicle indicators.

10. A method for evaluating a vehicle operator comprising:

automatically sensing what the operator looks at;

developing a record of what the operator looks at in the course of an operator evaluation session;

compiling a list of gaze targets; and comparing the record to the gaze targets to determine whether the operator looked at said gaze targets in the course of said evaluation session.

11. The method of claim 10 including receiving information about the current position of the vehicle.

12. The method of claim 10 including receiving information about the operation of vehicle controls.

13. The method of claim 10 including comparing the operator's performance to predefined standards.

14. The method of claim 10 including determining the frequency with which the operator looks at a given object.

15. The method of claim 10 including recording information about vehicle speed.

16. The method of claim 10 including prompting the operator to increase the frequency with which the operator looks at one or more objects.

17. The method of claim 16 including correlating what the operator looks at with the position the vehicle is at when the operator looked at the object.

18. An article comprising a medium that stores instructions for causing a processor based system to:

receive information about what a vehicle operator looks at;

make a record of what the operator looks at in the course of operator evaluation;

compile a list of gaze targets including items a vehicle operator may look at in the course of said operator evaluation; and compare the record to said gaze targets to determine whether the operator looked at each of said gaze targets during the course of said operator evaluation.

19. The article of claim 18 storing instructions for causing a processor based system to receive information about the current position of the vehicle.

20. The article of claim 18 storing instructions for causing a processor based system to determine the frequency with which the operator looks at a given object.

21. The article claim 18 storing instructions for causing a processor based system to prompt the operator to increase the frequency with which the operator looks at one or more objects.

22. The article of claim 18 storing instructions for causing a processor based system to correlate what the operator looks at with the position the vehicle is at when the operator looked at the object.

23. A method for evaluating a vehicle operator comprising:

automatically sensing what the operator looks at;

prompting the operator to increase the frequency with which the operator looks at one or more objects; and recording what the operator looks at.

24. The method of claim 23 including correlating what the operator looks at with the position the vehicle is at when the operator looked at the object.

25. A vehicle operator training system comprising:

a first vehicle mounted camera to scan the operator's head;

a second vehicle mounted camera to scan the operator's eye; and a controller to develop a record of what the operator looked at in the course of operator training using information from said first and second cameras.

* * * * *